Feb. 15, 1949. H. M. DODGE 2,461,969
VIBRATION ABSORBING SUPPORT
Filed March 23, 1945

INVENTOR.
Howard M. Dodge
BY
Evans + McCoy
ATTORNEYS

Patented Feb. 15, 1949

2,461,969

UNITED STATES PATENT OFFICE 2,461,969

VIBRATION ABSORBING SUPPORT

Howard M. Dodge, Wabash, Ind., assignor to The General Tire & Rubber Company, Akron, Ohio, a corporation of Ohio Application March 23, 1945, Serial No. 584,410

4 Claims. (Cl. 248—358)

This invention relates to vibration absorbing supports for instruments or machines, and is designed to impede the transmission of vibrations from an instrument or machine to the structure upon which it is mounted, or from the supporting structure to the machine or instrument.

This invention has for an object to provide a support in which the vibration absorbing cushioning element is in the form of a tubular rubber body which may be placed either under tension or under compression by the load imposed upon it.

A further object of the invention is to provide a support having a central load carrying post and a rubber cushioning body attached thereto in which the post may carry either a superposed or suspended load.

With the above and other objects in view, the invention may be said to comprise the cushioning support as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which Fig. 1 is a top plan view of a support embodying the invention;

Figure 1:
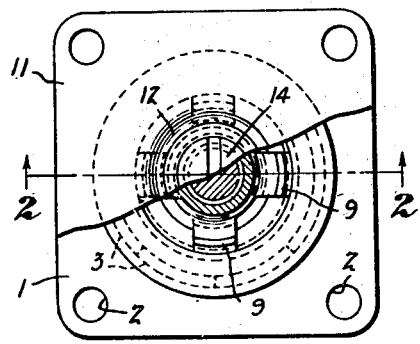

Referring to the accompanying drawings, the support of the present invention has an attaching plate 1 which may be of rectangular form and provided with bolt holes 2 at the corners thereof as shown in Fig. 1. The plate 1 has a central opening and is provided with tongues or flanges 3 which are struck up from the body thereof along the margin of the opening, the tongues 3 being alternately bent upwardly and downwardly and forming a reinforcing ring for the upper end of a tubular rubber cushioning body 4 which is molded upon the attaching plate to embed the flanges 3 in the tubular wall.

The tubular body 4 is of frusto-conical form, with its large end secured within the opening of the attaching plate 1. The lower end of the tubular body 4 has a supporting disk 5 mounted therein, the disk 5 having marginal tongues or flanges 6 struck up from the periphery thereof and embedded in the wall of the tubular member 4.

A flat sheet metal base member 7 rests upon the top face of the supporting disk 5 and has upwardly extending, diverging, resilient arms 8 which have outwardly bowed upper end portions 9 that bear against the interior of the tubular cushioning member 4 adjacent its upper end. A tubular post 10 rests upon the top of the base member 7 and an upper attaching plate 11 which has a portion depressed to form a recess 12 rests upon the upper end of the post 10. A bolt 13 having a head 14 seated in the recess 12, passes through the attaching plate 11, the tubular post 10, base member 7 and disk 5 and has a nut 15 at its lower end which may be tightened to clamp the post 10 tightly between the plate 11 and base member 7.

The tubular member 4, which is a relatively long member with a slight angle of taper, is stiffened by the spring arms 8 which increase the resistance to lateral movements of the lower end of the supporting member such as would cause tilting of the post 10.

If the attaching plate 1 is attached to a fixed support, the load mounted on the attaching plate 11 imposes a tension on the tubular member 4 which is yieldable under thrusts in the direction of the axis, or at an angle to the said axis. In some instances the upper attaching plate 11 may be attached to the fixed support and the attaching plate 1 secured to the supported member, in which case the load imposed through the plate 1 puts the tubular rubber member 4 under compression.

Figure 3:
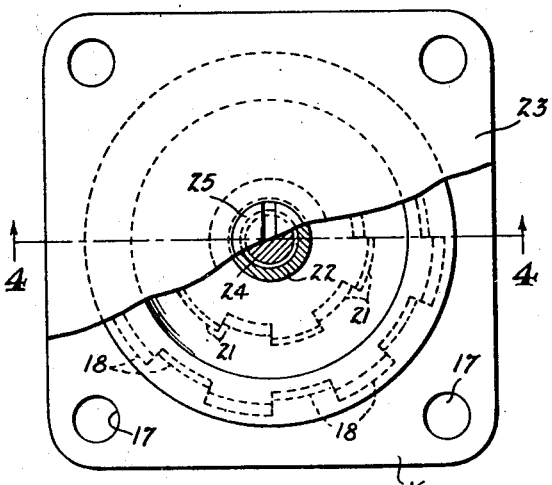
Fig. 3 is a top plan view of a modified form of support embodying the invention.
Figure 4:
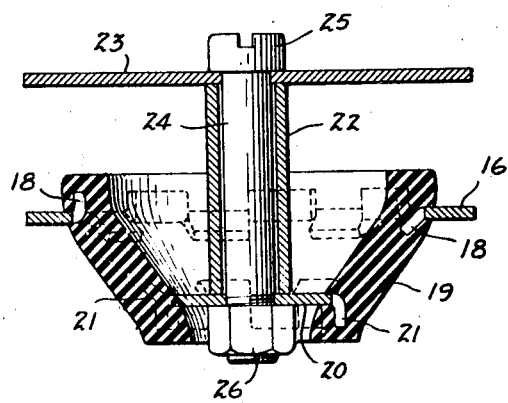
Fig. 4 is a section taken on the line indicated at 4—4 in Fig. 3.

In Figs. 3 and 4, a slightly modified form of the invention is illustrated, in which an attaching plate 16 provided with a bolt hole 17 has a central opening and is provided at the margin of the opening with tongues or flanges 18 struck upwardly and downwardly from the body thereof and embedded in the wall of a frusto conical tubular rubber cushioning member 19. The attaching plate 16 is secured to the large upper end of the cushioning member and a supporting disk 20 is mounted within the small end of the cushioning member, the disk 20 having upturned and downturned tongues or flanges 21 around its periphery which are embedded in the wall of the tubular member 19. A tubular post 22 rests upon the top of the disk 20 centrally thereof and an upper attaching plate 23 rests upon the upper end of the post 22. A bolt 24 extends through the plate 23, the post 22 and the disk 20, the bolt having a head 25 engaging the top of the plate 23 and a nut 26 engaging with the bottom of the disk 20 so that the post 22 can be tightly clamped between the disk 20 and the attaching plate 23.

Figure 2:
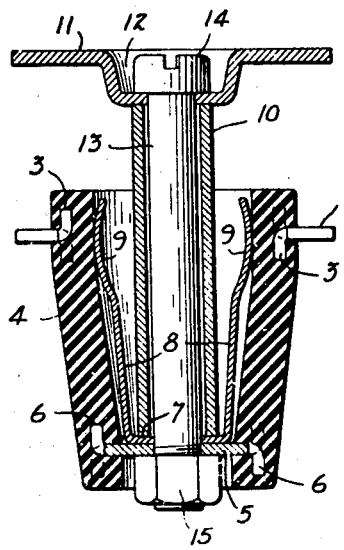
Fig. 2 is a section taken on the line indicated at 2—2 in Fig. 1.

In the modification shown in Figs. 3 and 4, the tubular cushioning body is shorter than in the modification shown in Figs. 1 and 2 and has a somewhat greater taper, and since the cushioning body is somewhat stiffer than the cushioning body in the modification first described, the interior bracing springs may be omitted.

It is to be understood that variations and modifications of the specific device herein shown and described for purposes of illustration, may be made without departing from the spirit of the invention.

What I claim is:

1. A cushioning support comprising a substantially frusto-conical downwardly tapering tubular body of rubber, an attaching plate having an opening to receive the large end of said body, a supporting disk secured within the lower end of said body, an upright load supporting post mounted on said disk centrally thereof and projecting through the upper end of said tubular rubber body, and leaf springs attached to said disk and bearing against the interior of the tubular member to resist tilting movements of said post and disk.

2. A cushioning support comprising a substantially frusto-conical downwardly tapering tubular body of rubber, an attaching plate having an opening to receive the large end of said body, a supporting disk secured within the lower end of said body, a resilient sheet metal member having a base portion resting upon said disk and upwardly diverging arms integral with said base portion and bearing against the interior of the tubular member, a tubular post resting upon said base portion of the sheet metal member, an upper attaching plate resting upon the top of said post and a bolt extending through said upper attaching plate, said post, said base portion and said disk.

3. A cushioning support comprising a substantially frusto-conical downwardly tapering tubular body of elastic rubber, an upper annular attaching plate surrounding the large end of said tubular rubber body, a supporting disk within the small end of said body, said plate and disk being disposed substantially perpendicular to the axis of said tubular rubber body and attached to axially spaced portions thereof, said annular plate having oppositely extending tongues struck up therefrom along the margin of its opening and embedded in the rubber body near the large end thereof, said disk having oppositely extending tongues struck up from the periphery thereof and embedded in the rubber body near its small end, and a load supporting post substantially coaxial with said tubular body and rigidly attached to said disk centrally thereof.

4. A cushioning support comprising a substantially frusto-conical downwardly tapering tubular body of elastic rubber, an upper annular attaching plate surrounding the large end of said tubular rubber body, a supporting disk within the small end of said body, said plate and disk being disposed substantially perpendicular to the axis of said tubular rubber body and attached to axially spaced portions thereof, a tubular post resting upon said disk centrally thereof and projecting beyond the top of said rubber body, an upper attaching plate resting upon the top of the post, and a bolt extending through the upper attaching plate, post and disk to rigidly clamp said post and upper attaching plate to said disk.

HOWARD M. DODGE.

REFERENCES CITED

The following references are of record in the file of this patent:

UNITED STATES PATENTS

| Number | Name | Date |
|---|---|---|
| 2,069,270 | Piron | Feb. 2, 1937 |
| 2,132,840 | Workman et al. | Oct. 11, 1938 |
| 2,367,697 | Stitz et al. | Jan. 23, 1945 |

FOREIGN PATENTS

| Number | Country | Date |
|---|---|---|
| 26,167 | Great Britain | Dec. 15, 1905 |